United States Patent Office 2,993,894
Patented July 25, 1961

2,993,894
(AMINOALKYL)PYRENES AND PROCESS FOR THEIR PREPARATION
Erich Marcus, John T. Fitzpatrick, and Frederick C. Frostick, Jr., Charleston, W. Va., assignors to Union Carbide Corporation, a corporation of New York
No Drawing. Filed Dec. 24, 1958, Ser. No. 782,624
6 Claims. (Cl. 260—247)

This invention relates to novel (aminoalkyl)pyrenes and to a process for their preparation. More particularly, the present invention relates to novel 1-(alpha-aminoalkyl)pyrenes and their acid salts, to a process for their preparation and to certain novel intermediates produced during their preparation.

The novel 1-(aminoalkyl)pyrenes of the present invention may be represented by the structural formula:

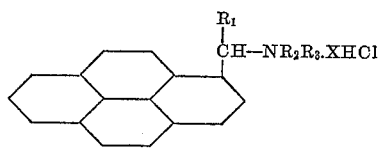

wherein $R_1$ is selected from the group consisting of hydrogen, alkyl and aryl, X is selected from the group consisting of 0, 1 and 2, and $NR_2R_3$ is selected from the group consisting of heterocyclic radicals containing from 5 to 6 atoms in the ring and radicals of the formula:

wherein $R_2$ and $R_3$ are selected from the group consisting of hydrogen, alkyl, aryl and pyridyl, at least one of $R_1$, $R_2$ and $R_3$ being hydrogen.

Illustrative of such 1-(alpha-aminoalkyl)pyrenes are:
1-(N,N-dimethylaminomethyl)pyrene,
1-(N,N-dimethylaminomethyl)pyrene hydrochloride,
1-(N,N-diethylaminomethyl)pyrene,
1-(N,N-diethylaminomethyl)pyrene hydrochloride,
1-(N-morpholinomethyl)pyrene,
1-(N-morpholinomethyl)pyrene hydrochloride,
1-(N-piperidinomethyl)pyrene,
1-(N-piperidinomethyl)pyrene hydrochloride,
1-(N-pyrrolidinomethyl)pyrene,
1-(N-pyrrolidinomethyl)pyrene hydrochloride,
1-[N-(N'-methyl)piperazinomethyl]pyrene,
1-[N-(N'-methyl)piperazinomethyl]pyrene dihydrochloride,
1-(N,N-dibutylaminomethyl)pyrene,
1-(N,N-dibutylaminomethyl)pyrene hydrochloride,
1-(N,N-dihexylaminomethyl)pyrene,
1-(N,N-dihexylaminomethyl)pyrene hydrochloride,
1-(alpha-N-methylaminoethyl)pyrene,
1-(alpha-N-methylaminoethyl)pyrene hydrochloride,
1-(alpha-N-hexylaminoethyl)pyrene,
1-(alpha-N-hexylaminoethyl)pyrene hydrochloride,
1-(alpha-aminoethyl)pyrene,
1-(alpha-aminoethyl)pyrene hydrochloride,
1-(alpha-aminobenzyl)pyrene,
1-(alpha-aminobenzyl)pyrene hydrochloride,
1-(aminomethyl)pyrene,
1-(aminomethyl)pyrene hydrochloride,
tris(1-pyrenylmethyl)amine,
tris(1-pyrenylmethyl) amine hydrochloride,
1-(N-methylaminomethyl)pyrene,
1-(N-methylaminomethyl)pyrene hydrochloride,
1-(N-butylaminomethyl)pyrene,
1-(N-butylaminomethyl)pyrene hydrochloride,
1-(N-anilinomethyl)pyrene,
1-(N-anilinomethyl)pyrene hydrochloride,
1-[N-(2-pyridyl)aminomethyl]pyrene and
1-[N-(2-pyridyl)aminomethyl]pyrene hydrochloride.

The novel (aminoalkyl)pyrenes of the present invention may be prepared by the reaction of a carbonyl compound selected from the group consisting of 1-pyrenecarboxaldehyde and a 1-acylpyrene, such as 1-acetylpyrene, or 1-benzoylpyrene, with an amide having the formula: $HCONR_2R_3$, wherein $R_2$ and $R_3$ are as defined above.

The reaction is illustrated by the following equation:

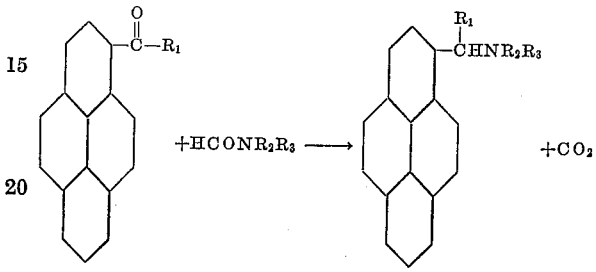

wherein $R_1$, $R_2$ and $R_3$ have the values set forth above.

The carbonyl compound and the amide may generally be present in widely varying proportions but are preferably present in a molar ratio of from about 1:1 to about 1:10, respectively. Formic acid, in an amount corresponding to 0.01 to 5 mols of formic acid per mol of carbonyl compound, is preferably present during the reaction.

The reaction may be conducted by heating a solution of the carbonyl compound in the amide at a temperature of from about 100 to about 250° C. for a period of from about 1 to about 100 hours, preferably at a temperature of from about 150 to about 200° C. for a period of about 2 to 10 hours.

When neither $R_2$ nor $R_3$ is hydrogen, the product may be recovered as a residue by distillation of any unreacted amide and formic acid, if present. The distillation is preferably conducted under vacuum. The residue product is, in many cases, pure enough for use without further treatment. However, the products may conveniently be isolated in the pure state, as the hydrochloride salts, by dissolving the crude product in a solvent such as ethyl ether, dioxane or benzene and introducing dry hydrogen chloride gas into the solution (in an amount corresponding to at least one mole equivalent) to precipitate the 1-(aminoalkyl)pyrene hydrochloride. Similar salts of other anhydrous acids may also be prepared in a similar fashion.

The free amine can be obtained from the hydrochloride by treating it with an aqueous base, such as ammonia, and a water-immiscible solvent, such as ether or benzene. Separation of the organic layer, followed by removal of the solvent leaves the free amine as residue.

When $R_2$ or $R_3$ or both are hydrogen, the crude reaction mixture, after removal of excess amide and formic acid, if present, contains a mixture of the desired amine and its corresponding N-formyl derivative. The formyl derivative can be hydrolyzed by heating the crude reaction mixture with aqueous or alcoholic acid or base. A convenient method comprises refluxing the crude mixture with an excess of concentrated hydrochloric acid and butanol for 2 to 100 hours, preferably from 4 to 24 hours. The crude amine hydrochloride is obtained by distilling off hydrochloric acid, butanol and formic acid. The crude amine hydrochloride can then be treated with an aqueous base, such as ammonia, and a water-immiscible solvent, such as benzene, to give a solution of the free amine in the non-aqueous layer. The free amine can then be recovered by distilling off the solvent, or the amine hydrochloride can be obtained by treating the solution with gaseous hydrogen chloride.

The monoalkylaminomethylpyrenes and monoarylaminomethylpyrenes can also be easily prepared in two steps by catalytic reduction of the imines derived from 1-pyrenecarboxaldehyde and the corresponding amine. This process is illustrated by the following equations:

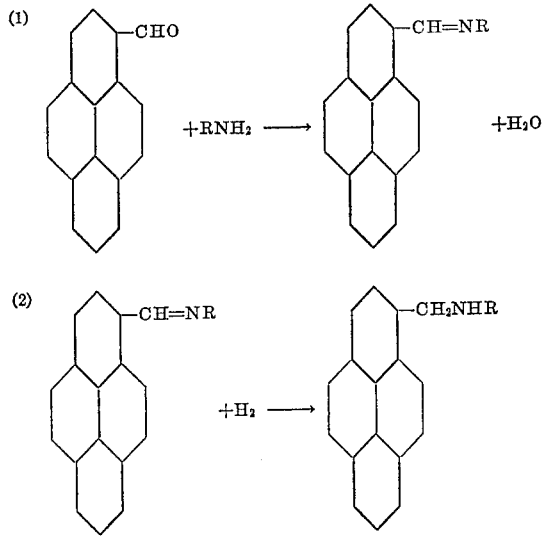

wherein R is alkyl, aryl or pyridyl.

The first step of the above-described process may be conducted by reacting one mole of the aldehyde with at least one mole of a primary amine, either with or without a solvent, such as an alcohol or an aromatic hydrocarbon, at a temperature of from about 70 to about 200° C. for about 1 to about 20 hours to yield the corresponding imine. The imine can be recovered from the reaction mixture by crystallization or by distillation of solvent. The imine can be purified by recrystallization, if necessary.

The imines can be reduced to the amines by hydrogenation in a solvent such as alcohol or dioxane in the presence of a catalyst such as Raney nickel or platinum oxide. The reaction conditions may be varied in accordance with the generally accepted principles of hydrogenation.

The imines produced as intermediates by the above reaction are new compounds, which may be represented by the structural formula:

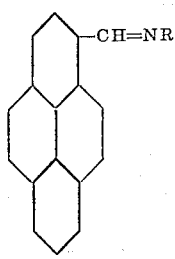

wherein R is alkyl, aryl or pyridyl.

Illustrative of such imines are 1-pyrenalbutylamine, 1-pyrenalaniline and 2-(1-pyrenalamino)pyridine.

The imines, in addition to their utility for the preparation of the novel compounds of the present invention, are also useful as fungicides.

The (aminoalkyl)pyrenes in phich $R_2$ and $R_3$ are both hydrogen can also be prepared by hydrogenation of the oximes of the corresponding carbonyl compounds, as illustrated by the following equations:

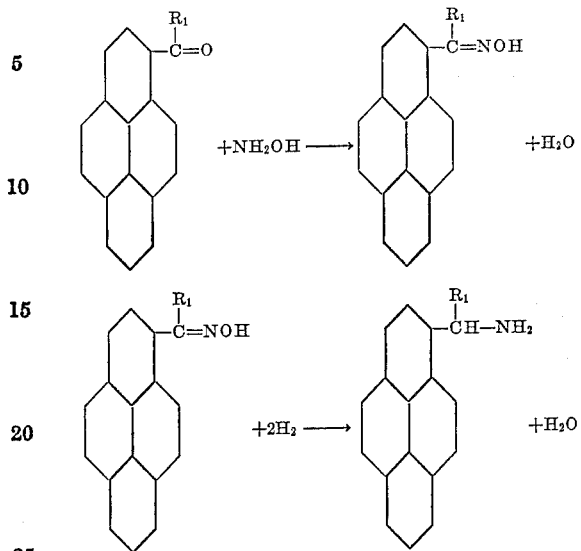

The preparation of the oximes from the carbonyl compounds can be carried out by conventional means.

The oximes can be hydrogenated readily under a variety of conditions. The conditions described in U.S. Patent 1,989,093 (palladium on charcoal in alcohol containing hydrochloric acid) have been found to give particularly favorable results.

The carbonyl compounds, 1-pyrenecarboxaldehyde and the 1-acylpyrenes, are known materials, which can be prepared by methods known in the art.

1-pyrenecarboxaldehyde can be prepared from pyrene, phosphorus oxychloride, and N-methylformanilide or N,N-dimethylformamide. The 1-acylpyrenes can be synthesized from pyrene and an acid anhydride or an acyl halide such as acetic anhydride or benzoyl chloride, respectively, in the presence of a catalyst.

The following examples are illustrative:

EXAMPLE I

*1-(N,N-dimethylaminomethyl)pyrene hydrochloride*

A mixture of 11.5 grams (0.05 mole) of 1-pyrenecarboxaldehyde, 27.5 grams (0.375 mole) of N,N-dimethylformamide, and 2.5 milliliters of 90 percent formic acid was refluxed for four hours between 146 and 152° C. After removal of the excess of N,N-dimethylformamide and formic acid by distillation, the residue was dissolved in ethyl ether, dried over anhydrous sodium sulfate, and filtered. Introduction of dry hydrogen chloride into the ethereal solution precipitated 10.66 grams (72 percent) of white 1-(N,N-dimethylaminomethyl)pyrene hydrochloride having the following properties: melting point 270–277° C., with decomposition; analysis: C, 76.86, 76.96, 77.18; H, 6.57, 6.44, 6.28; N, 4.70; neutralization equivalent, 299. (Calculated for $C_{19}H_{18}NCl$: C, 77.14; H, 613; N, 4.74; neutralization equivalent, 296.)

EXAMPLE II

*1-(N,N-diethylaminomethyl)pyrene hydrochloride*

A mixture of 8.0 grams (0.11 mole) of diethylamine and 5.6 grams (0.11 mole) of 90 percent formic acid was heated until the distillate reached a temperature of 138° C. To 8.5 grams of the residue was added 4.6 grams (0.02 mole) of 1-pyrenecarboxaldehyde. After refluxing for four hours between 155 and 158° C. and removal of excess diethylformamide by distillation 5.54 grams of an oil remained. Most of this oil (4.82 grams) was dissolved in ethyl ether and filtered. Dry hydrogen chloride was then added to precipitate 4.4 grams (78 percent) of a crude, gray precipitate. Recrystallization from methanol resulted in a white precipitate of 1-(N,N- diethylaminomethyl)pyrene hydrochloride having a melting point of 238–243° C. with decomposition and analyzing C, 77.36, 77.36; H, 7.15, 7.22; N, 4.05; N.E., 327. (Calculated for $C_{21}H_{22}NCl$: C, 77.88; H, 6.85; N, 4.33; N.E., 324.)

EXAMPLE III

1-(N-morpholinomethyl)pyrene hydrochloride

A mixture of 65.5 grams (0.75 mole) of morpholine and 38.5 grams (0.75 mole) of 90 percent formic acid was heated until the distillate reached a temperature of 118° C. To 82 grams of the residue were added 23.0 grams (0.1 mole) of 1-pyrenecarboxaldehyde and 5 milliliters of 90 percent formic acid. After refluxing for four hours at a temperature between 182 and 185° C. and removal of excess N-formylmorpholine by distillation 31 grams of an oil remained. The residue was dissolved in ethyl ether and filtered. Dry hydrogen chloride gas was then added to precipitate 32.3 grams (95 percent) of 1-(N-morpholinomethyl)pyrene hydrochloride, having a melting point of 256–263° C., with decomposition, and analyzing as follows: C, 74.49, 74.98; H, 6.17, 6.17; N, 4.24, N.E., 346, 348. (Calculated for $C_{21}H_{20}ONCl$: C, 74.65; H, 5.97; N, 4.15; neutralization equivalent, 338.)

To obtain a pure sample of the amine, 2.0 grams of the hydrochloride were treated with 100 ml. of ether, 20 ml. of concentrated ammonium hydroxide and 20 ml. of water. The organic layer was separated, washed with water, dried over magnesium sulfate and filtered. After removal of the ether by distillation, 1.75 grams of a viscous, yellow oil remained, which was recrystallized from petroleum ether (B.P. 65–70° C.) to yield 1-(N-morpholinomethyl)pyrene, having a M.P. of 90–93° C. and analyzing as follows: C, 83.81, H, 6.30; N, 4.56. (Calculated for $C_{21}H_{19}NO$: C, 83.69, H, 6.35, N, 4.65.)

EXAMPLE IV

1-(N-piperidinomethyl)pyrene hydrochloride

In this example N-formylpiperidine was used in place of N-formylmorpholine. Otherwise, the experiment was conducted under conditions similar to those of Example III. The yield of 1-(N-piperidinomethyl)pyrene hydrochloride was 91 percent, the product having a melting point of 256–259° C., with decomposition, and analyzing as follows: C, 78.19; H, 6.86; N, 4.37; Cl, 11.05, 10.98; neutralization equivalent, 332. (Calculated for

$C_{22}H_{22}NCl$

C, 78.66; H, 6.61; N, 4.17; Cl, 10.56; neutralization equivalent, 336.)

EXAMPLE V

1-(N-pyrrolidinomethyl)pyrene hydrochloride

In this example N-formylpyrrolidine was used in place of N-formylmorpholine. The experiment was conducted under conditions similar to those of Example III. The yield of 1-(N-pyrrolidinomethyl)pyrene hydrochloride was 87 percent. The product had a melting point of 250–260° C., with decomposition, and analyzed as follows: C, 77.84; H, 6.36; N, 4.55; Cl, 11.05, 11.30, 11.01; neutralization equivalent, 324. (Calculated for

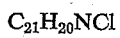

$C_{21}H_{20}NCl$

C, 78.41; H, 6.22; N, 4.35; Cl, 11.02; neutralization equivalent, 322.)

EXAMPLE VI

1-[N-(N'-methyl)piperazinomethyl]pyrene dihydrochloride

The experiment was conducted under conditions similar to those of Example III, but with N-formyl-N'-methylpiperazine in place of N-formyl morpholine. The yield of crude 1-[N-(N'-methyl)piperazinomethyl]pyrene dihydrochloride was 86 percent. Recrystallization from concentrated hydrochloric acid afforded a sample having a melting point of 250–260° C., with decomposition, and analyzing as follows: C, 67.96; H, 6.25; N, 7.24; Cl, 17.91, 17.59; neutralization equivalent, 198. (Calculated for $C_{22}H_{24}N_2Cl_2$: C, 68.21; H, 6.25; N, 7.23; Cl, 18.26; N.E., 194.)

EXAMPLE VII

1-(N,N-dibutylaminomethyl)pyrene hydrochloride

The experiment was conducted under conditions similar to those of Example III, but with N,N-dibutylformamide in place of N-formylmorpholine. The crude product was recrystallized from acetone to give a 35 percent yield of 1-(N,N-dibutylaminomethyl)pyrene hydrochloride, having a melting point of 149–153° C. and analyzing as follows: C, 78.30, 78.66, 78.23; H, 7.78, 8.15, 7.87; N, 3.69, 3.76; neutralization equivalent 383. (Calculated for $C_{25}H_{30}NCl$: C, 79.02; H, 7.96; N, 3.69; neutralization equivalent, 380.)

EXAMPLE VIII

1-(N,N-dihexylaminomethyl)pyrene hydrochloride

The experiment was conducted under similar conditions to those of Example III, but with N,N-dihexylformamide in place of N-formylmorpholine. The crude product was recrystallized from acetone to give a 42 percent yield of 1-(N,N-dihexylaminomethyl)pyrene hydrochloride, having a melting point of 134–136° C. and analyzing as follows: C, 79.99; H, 9.11; N, 3.53; neutralization equivalent, 436. (Calculated for $C_{29}H_{38}NCl$: C, 79.87; H, 8.78; N, 3.21; N.E., 436.)

EXAMPLE IX

1-(alpha-N-methylaminoethyl)pyrene hydrochloride

A mixture of 12.2 grams (0.05 mole) of 1-acetylpyrene, 22.2 grams (0.375 mole) of N-methylformamide, and 2.5 milliliters of 90 percent formic acid was refluxed for four hours between 157 and 176° C. After removal of the excess of N-methylformamide and formic acid by distillation, 14.4 grams of a residue remained. This residue was treated with 35 milliliters of concentrated hydrochloric acid and 65 milliliters of butanol and then refluxed for twenty-three hours. A small amount of an oily viscous material stuck to the flask; the remainder of solid and liquid was decanted. After removal of solvent by distillation, 11.3 grams of a yellow solid was treated with a mixture of ethyl ether and concentrated ammonium hydroxide. The ethereal layer was separated, washed with water, dried over anhydrous sodium sulfate, and filtered. Introduction of dry hydrogen chloride gas precipitated 7.12 grams (48 percent) of crude 1-(alpha-N-methylaminoethyl)pyrene hydrochloride. Recrystallization from water in the presence of charcoal yielded a sample of the product having a white color, and a melting point of 237–242° C., with decomposition, and analyzing as follows: C, 77.32; H, 6.14; N, 4.63; neutralization equivalent, 292. (Calculated for $C_{19}H_{18}NCl$: C, 77.14; H, 6.13; N, 4.74; neutralization equivalent, 296.)

EXAMPLE X

1-(alpha-N-hexylaminoethyl)pyrene hydrochloride

In this example N-hexylformamide was used in place of N-methylformamide. Otherwise, the experiment was conducted under conditions similar to those of Example IX. The yield of the crude brown product was 31 percent. The product was treated with acetone, filtered and recrystallized from water to give a sample of white 1-(alpha-N-hexylaminoethyl)pyrene hydrochloride, having a melting point of 220–225° C., with decomposition, and analyzing as follows: C, 78.71; H, 7.72; N, 3.99; Cl, 9.74; neutralization equivalent, 373. (Calculated for $C_{24}H_{28}NCl$: C, 78.82; H, 7.65; N, 3.84; Cl, 9.69; neutralization equivalent, 366.)

EXAMPLE XI

1-(alpha-aminoethyl)pyrene hydrochloride

In this example formamide was used in place of N-methylformamide. Otherwise, the experiment was conducted under conditions similar to those of Example IX. The yield of light yellow 1-(alpha-aminoethyl)pyrene hydrochloride was 79 percent, the product having a melting point of 230–250° C., with decomposition, and analyzing as follows: C, 76.33; H, 5.44; N, 4.67; Cl, 12.49; neutralization equivalent, 280. (Calculated for $C_{18}H_{16}NCl$: C, 76.76; H, 5.68; N, 4.98; Cl, 12.58; neutralization equivalent, 282.)

EXAMPLE XII

1-(alpha-aminobenzyl)pyrene hydrochloride

In this example, formamide and 1-benzoylpyrene were used in place of N-methylformamide and 1-acetylpyrene, respectively. Otherwise, the experiment was conducted under conditions similar to those of Example IX. The yield of crude tan product was 25 percent. The crude product was dissolved in hot water and filtered. The addition of hydrochloric acid to the filtrate precipitated white 1-(alpha-aminobenzyl)pyrene hydrochloride, having a melting point of 240–250° C., with decomposition, and analyzing as follows: C, 80.37; H, 5.32; N, 4.16; neutralization equivalent, 346. (Calculated for $C_{23}H_{18}NCl$: C, 80.36; H, 5.24; N, 4.08; neutralization equivalent, 344.)

EXAMPLE XIII

1-(aminomethyl)pyrene hydrochloride

In this example, 1-pyrenecarboxaldehyde and formamide were used in place of 1-acetylpyrene and N-methylformamide, respectively. Otherwise, the experiment was conducted under conditions similar to those of Example IX. After hydrolysis and treatment with ammonium hydroxide and ether, a considerable amount of the product was insoluble. Introduction of gaseous hydrogen chloride into the ethereal layer of the filtrate yielded a white solid having a neutralization equivalent of 336. This solid was dissolved in hot water and filtered. Addition of hydrochloric acid to the filtrate afforded about 15 percent of a sample of white 1-(aminomethyl)pyrene hydrochloride, having a melting point of 244–250° C., with decomposition, and analyzing as follows: C, 76.02; H, 5.09; N, 5.30; neutralization equivalent, 272. (Calculated for $C_{17}H_{14}NCl$: C, 76.25; H, 5.27; N, 5.23; neutralization equivalent, 268.)

The material which was insoluble in a mixture of ether and ammonium hydroxide was converted to its hydrochloride by refluxing it with a mixture of butanol and concentrated hydrochloric acid. About a 50 percent yield of white tris(3-pyrenylmethyl) amine hydrochloride was obtained analyzing as follows: C, 87.38; H, 4.88; N, 1.96; Cl, 4.61, 4.80; N.E., 707. (Calculated for $C_{51}H_{34}NCl$: C, 87.97; H, 4.92; N, 2.01; Cl, 5.09; N.E., 696.)

EXAMPLE XIV

1-(N-methylaminomethyl)pyrene hydrochloride

A mixture of 11.5 grams (0.05 mole) of 1-pyrenecarboxaldehyde, 22.1 grams (0.375 mole) of N-methylformamide, and 2.5 milliliters of 90 percent formic acid was refluxed for four hours between 168 and 178°. The mixture was then treated in a manner similar to that employed in Example IX. The yield of the crude hydrochloride was 8.91 grams (about 67 percent) having a neutralization equivalent of 392. This product appeared to be a mixture of about equal parts of 1-(N-methylaminomethyl)pyrene hydrochloride and N-methyl-N,N-bis(3-pyrenylmethyl)amine hydrochloride. Recrystallization of 3 grams of this solid from 800 milliliters of 6 N hydrochloric acid afforded 0.47 gram of 1-(N-methylaminomethyl)pyrene hydrochloride, having a melting point of 240–250° C., with decomposition, and analyzing as follows: C, 75.93, 75.81; H, 5.57, 5.43; N, 4.71; neutralization equivalent, 282. (Calculated for $C_{18}H_{16}NCl$: C, 76.72; H, 5.72; N, 4.97; Cl, 12.58; neutralization equivalent, 282.)

1-(N-methylaminomethyl)pyrene was also obtained by the catalytic reduction of the corresponding 1-pyrenalmethylamine, which was prepared from 1-pyrenecarboxaldehyde and methylamine. Treatment of 1-(N-methylaminomethyl)pyrene with hydrogen chloride gave the hydrogen chloride salt with an overall yield of 70 percent (based on 1-pyrene carboxaldehyde). The salt analyzed as follows: C, 77.24; H, 5.85; N, 5.05; Cl, 12.32; and had a neutralization equivalent of 283.

EXAMPLE XV

1-(N-butylaminomethyl)pyrene hydrochloride

A mixture of 28.74 grams (0.125 mole) of 1-pyrenecarboxaldehyde, 91.25 grams (1.25 moles) of butylamine and 500 milliliters of ethanol was refluxed for one hour. After removal of the solvent and the excess of butylamine, the residue was recrystallized with the aid of charcoal from petroleum ether, boiling point 65–67°. A first crop of 24.51 grams, melting point 64–65.5°, and a second crop (of crystals of 1-pyrenalbutylamine) of 4.25 grams, melting point 63–65° C., were obtained (combined yield 81 percent).

The same material obtained in another run was recrystallized again from petroleum ether to give a sample having a melting point of 65–67° C. of yellow 1-pyrenalbutylamine, which analyzed as follows: C, 88.08; H, 6.41; N, 5.28. (Calculated for $C_{21}H_{19}N$: C, 88.38; H, 6.71; N, 4.91.)

A mixture of 11.4 grams of 1-pyrenalbutylamine, 200 milliliters of ethanol, and 0.4 gram of Adams' catalyst (a platinum oxide catalyst) was hydrogenated at room temperature in a low pressure hydrogenator for one hour at 50 p.s.i.g. The solution was brought to boiling, filtered and allowed to cool to give 8.29 grams (72 percent) of a white solid, melting point 88–94°. When an ethereal solution of this material was treated with gaseous hydrogen chloride, yellow 1-(N-butylaminomethyl)pyrene hydrochloride was obtained, having a melting point of 225–235° C., with decomposition, and analyzing as follows: C, 77.65; H, 6.53; N, 4.34; Cl, 10.85; neutralization equivalent, 328. (Calculated for $$C_{21}H_{22}NCl$$

C, 77.88; H, 6.85; N, 4.33; Cl, 10.95; neutralization equivalent, 324.)

EXAMPLE XVI

1-(N-anilinomethyl)pyrene

A mixture of 23.0 grams (0.1 mole) of 1-pyrenecarboxaldehyde, 9.3 grams (0.1 mole) of aniline, and 100 milliliters of ethanol was refluxed for one hour and forty minutes. After cooling in an ice-bath, 28.61 grams (94 percent) of a yellow solid having a melting point of 126–128° C. was collected. Another recrystallization from ethanol afforded a sample of 1-pyrenalaniline having a melting point of 125–128° C. and analyzing as follows: C, 90.99; H, 4.35; N, 4.59. (Calculated for $C_{23}H_{15}N$: C, 90.46; H, 4.95; N, 4.59.)

A mixture of 15.0 grams of 1-pyrenalaniline, 200 milliliters of acetic acid, and 0.5 gram of Adams' catalyst was hydrogenated at room temperature in a low-pressure hydrogenator for one hour at 50 p.s.i.g. The solid was collected by filtration and treated with a mixture of dilute ammonium hydroxide and ethyl ether. The ethereal layer was separated, washed with water, dried over potassium hydroxide and filtered. After removal of solvent by distillation, the residue was recrystallized from butanol to give 7.1 grams of a golden-yellow solid, having a melting point of 141–143.5° C. with a yield of 47 percent. Another recrystallization from ethanol afforded a sample of 1-(N-anilinomethyl)pyrene, having a melting point of 143–145° and analyzing as follows: C, 89.56; H, 5.23; N, 4.85. (Calculated for $C_{23}H_{17}N$: C, 89.86; H, 5.58; N, 4.56.)

EXAMPLE XVII

1-[-(2-pyridyl)aminomethyl]pyrene

A mixture of 23.0 grams (0.1 mole) of 1-pyrenecarboxaldehyde and 9.4 grams (0.1 mole) of 2-aminopyridine was heated for forty minutes between 167 and 186°. A nitrogen stream removed the water formed during the reaction. Recrystallization from benzene gave 19.4 grams (63 percent) of a yellow solid, having a melting point of 152–157° C. Another recrystallization from benzene afforded an analytical sample of 2-(1-pyrenalamino)pyridine having a melting point of 158–160° C. and analyzing as follows: C, 86.42, 86.37; H, 4.59, 4.55; N, 9.17, 9.17. (Calculated for $C_{22}H_{14}N_2$: C, 86.25; H, 4.61; N, 9.15.)

A mixture of 10.8 grams of 2-(1-pyrenalamino)pyridine, 200 milliliters of ethanol, and 0.4 gram of Adams' catalyst was hydrogenated at room temperature in a low-pressure hydrogenator for four hours at 36 p.s.i.g. The solid was collected by filtration and recrystallized from butanol to give 7.6 grams of fine ivory-colored needles having a melting point of 165–167° C. and 0.9 gram of ivory-colored needles having a melting point of 160–166° C. (combined yield 78 percent). Another recrystallization of the first crop from ethanol afforded a sample of 1-[N-(2-pyridyl)aminomethyl]pyrene having a melting point of 165–167° C. and analyzing as follows: C, 84.97, 85.28; H, 5.47, 5.58; N, 9.33, 9.28. (Calculated for $C_{22}H_{16}N_2$: C, 85.69; H, 5.23; N, 9.08.)

EXAMPLE XVIII

1-(aminomethyl)pyrene hydrochloride

A mixture of 10 g. of 1-pyrenecarboxaldehyde, 10 g. of hydroxylamine hydrochloride, 50 ml. of pyridine and 50 ml. of ethanol was refluxed for two hours, with stirring. The ethanol solvent was then removed by distillation and the residue was washed with water, filtered and recrystallized from butanol to give 8.3 g. (78 percent) of yellow needles, having a melting point of 189–192° C. Recrystallization of the yellow needles from butanol resulted in the production of 1-pyrenecarboxaldoxime, having a melting point of 191.5–192.5° C. and analyzing as follows: C, 82.89; H, 4.32; N, 6.05. (Calculated for $C_{17}H_{11}ON$: C, 83.24; H, 4.52; N, 5.71.)

A mixture of 2.0 g. (0.008 mole) of 1-pyrenecarboxaldoxime, 2.0 g. of palladium on charcoal (comprising 5 percent palladium) and 150 ml. of ethanol, containing 0.04 mole of hydrogen chloride, was hydrogenated at room temperature for one hour at 50 p.s.i.g. The reaction mixture was brought to a boil, filtered and the filter cake was exhaustively extracted with hot methanol. After removal of the ethanol solvent from the combined filtrates, the residue was dissolved in 200 ml. of hot water and filtered. Then 30 ml. of concentrated hydrochloric acid was added, whereby 1.56 g. (72 percent) of white 1-(aminoethyl)pyrene hydrochloride was precipitated.

The 1-(alpha-aminoalkyl)pyrenes of the present invention are useful as bactericides.

The data in Table I, which follows, illustrates the effectiveness of the present materials as bactericides. The data were obtained using the following test procedure:

*Test organisms.*—*Escherichia coli* and *Micrococcus pyogenes* var. *aureus* cultured on nutrient agar (pH 7.0) at 20° C. constitute the test organisms for this test. The organisms are transferred to nutrient broth 24 hours prior to inoculation.

*Pre-testing preparations.*—Prepare nutrient broth according to the following formula:

Bacto nutrient broth (dehydrated) _____grams__ 8
Distilled water _____ml__ 1000

Dissolve the broth in the water and add 8 ml. aliquots to test tubes. Plug and autoclave for 20 minutes at 15 lbs. pressure.

*Application of toxicant.*—To 2 ml. of the standardly prepared test solution of the compound add ½ ml. of bacterial suspension of each test organism.

Cover tubes with a paper towel and allow a 24-hour contact period at 20° C. At the end of 24 hours, transfer one loopful of the toxicant bacteria mixture to the sterile tubes of nutrient broth using aseptic technique.

*Concentration of toxicant.*—The test compounds are formulated by a standard procedure of solution in acetone, addition of an emulsifier and dilution with water. Primary screening tests are run at 250 p.p.m.

*Holding conditions.*—The inoculated broth tubes are incubated at 20° C. for 48 hours.

*Record of results.*—The ability of a chemical to inhibit growth of bacteria is visually rated according to the following designations:

5=no growth
3=slight to moderate growth
1=severe, equal, or greater growth than control

TABLE I

| Compound | Micrococcus pyogenes var. aureus (250 p.p.m.) | Escherichia coli (250 p.p.m.) |
| --- | --- | --- |
| 3-(Aminomethyl)pyrene-hydrochloride | 5 | 5 |
| 3-(N-Methylaminomethyl)pyrene hydrochloride | 5 | 5 |
| 3-(N-Butylaminomethyl)pyrene hydrochloride | 5 | 1 |
| 3-[N-(N'-Methyl)piperazinomethyl] pyrene dihydrochloride | 5 | 1 |
| 3-(alpha-Aminoethyl)pyrene hydrochloride | 5 | 5 |
| 3-(alpha-N-Methylamino) ethylpyrene hydrochloride | 5 | 5 |
| 3-(alpha-Aminobenzyl)pyrene hydrochloride | 5 | 5 |

As used herein, unless otherwise indicated, all parts and percentages are by weight.

What is claimed is:

1. Compounds having the formula:

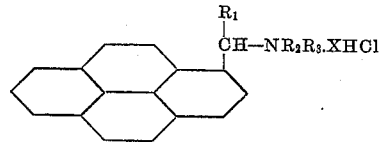

wherein $R_1$ is selected from the group consisting of hydrogen, methyl and phenyl; X is a number selected from the group consisting of 0, 1 and 2; and $NR_2R_3$ is selected from the group consisting of morpholino, piperidino, pyrrolidino, N'-methylpiperazino and radicals having the formula:

wherein $R_2$ and $R_3$ are selected from the group consisting of hydrogen, lower alkyl radicals, phenyl, 2-pyridyl, and 1-pyrenylmethyl, at least one of said $R_1$, $R_2$ and $R_3$ being hydrogen.

2. 1-(N,N-dimethylaminomethyl)pyrene hydrochloride.

3. 1-(N-morpholinomethyl)pyrene hydrochloride.

4. 1-[N-(N'-methyl)piperazinomethyl]pyrene dihydrochloride.

5. 1-(alpha-aminoethyl)pyrene hydrochloride.
6. 1-(alpha-aminobenzyl)pyrene hydrochloride.

References Cited in the file of this patent

UNITED STATES PATENTS

| | | |
|---|---|---|
| 1,873,402 | Herzberg | Aug. 23, 1932 |
| 2,108,147 | Speer | Feb. 15, 1938 |
| 2,403,483 | Cusic | July 9, 1946 |
| 2,577,121 | Goodson | Dec. 4, 1951 |
| 2,636,032 | Weston et al. | Apr. 21, 1953 |
| 2,647,896 | Stauffer et al. | Aug. 4, 1953 |

FOREIGN PATENTS

| | | |
|---|---|---|
| 536,881 | Great Britain | May 30, 1941 |
| 703,309 | Great Britain | Feb. 3, 1954 |
| 956,851 | Germany | Jan. 24, 1957 |

UNITED STATES PATENT OFFICE

CERTIFICATION OF CORRECTION

Patent No. 2,993,894             July 25, 1961

Erich Marcus et al.

It is hereby certified that error appears in the above numbered patent requiring correction and that the said Letters Patent should read as corrected below.

Column 3, line 39, after "for" insert -- from --; line 74, for "phich" read -- which --; column 4, line 59, for "613" read -- 6.13 --; column 9, line 8, for "1-[-(2-pyridyl)aminomethyl]pyrene" read -- 1-[N-(2-pyridyl)aminomethyl]pyrene --.

Signed and sealed this 10th day of April 1962.

Attest:

ERNEST W. SWIDER
Attesting Officer

DAVID L. LADD
Commissioner of Patents

Notice of Adverse Decision in Interference

In Interference No. 92,942 involving Patent No. 2,993,894, E. Marcus, J. T. Fitzpatrick and F. C. Frostick, Jr., (Aminoalkyl) Pyrenes and process for their preparation, final judgment adverse to the patentees was rendered Sept. 18, 1964, as to claim 1.
[*Official Gazette October 27, 1964.*]